United States Patent Office 3,462,474
Patented Aug. 19, 1969

3,462,474
SULFONATION PROCESS
Aubrey Westlake Michener, Jr., Rockaway, and Benjamin Veldhuis, Morristown, N.J., assignors to Allied Chemical Corporation, New York, N.Y., a corporation of New York
Filed Oct. 11, 1966, Ser. No. 585,935
Int. Cl. C07c 139/16, 139/14, 139/00
U.S. Cl. 260—458    6 Claims

ABSTRACT OF THE DISCLOSURE

Improved method for removing residual sulfur trioxide and entrained organics from diluent gas stream exiting a sulfonation or sulfation reactor and recycling the scrubbed diluent gas stream; preferably the used scrubbing liquid is recycled to the reaction zone for use as at least part of the organic liquid reactant.

---

This application relates to the sulfonation of liquid organic compounds with mixtures of sulfur trioxide and an inert diluent gas such as air to form alkyl aryl sulfonic acids useful in the manufacture of detergents and surfactants. Since sulfation can also be carried out by using different starting materials, such as lauryl or myristyl alcohol, with mixtures of sulfur trioxide and inert diluent gas, the term sulfonation as used herein in the specification and claims is meant to include sulfation.

The two main processes for carrying out sulfonation of the type mentioned are batch sulfonation and continuous sulfonation.

In typical batch sulfonation, the $SO_3$ and inert diluent gas are mixed and then continuously fed into a reaction zone consisting of a reaction vessel which has previously been charged with the desired quantity of organic liquid reactant to be sulfonated, for example, an alkylated mononuclear aromatic liquid such as dodecylbenzene or tridecylbenzene. The $SO_3$ and diluent gas are continuously fed into the reaction vessel during reaction and are thoroughly mixed with the organic liquid reactants, for example, by bubbling the mixed gas through the organic liquid reactant. The $SO_3$ reacts with the organic liquid reactant, forming a sulfonic acid such as dodecylbenzene sulfonic acid. Used inert diluent gas, containing small amounts of residual $SO_3$, sulfonic acid, sulfonic acid anhydride, and unreacted organic liquid reactant as contaminants is continuously removed from the reaction vessel during the reaction. The used inert diluent gas, can either be mixed with fresh $SO_3$ and recycled into the reaction zone, or expelled into the atmosphere, preferably recycled. In batch sulfonation the sulfonated product is not continuously withdrawn from the reaction zone during the process, but is rather removed when the batch is sulfonated.

In typical continuous sulfonation, the $SO_3$ and inert diluent gas are mixed and then continuously fed through the center of a reaction zone consisting of a hollow reactor down the inside walls of which is continuously flowed a film of the organic liquid reactant to be sulfonated, for example, an alkylated mononuclear aromatic compound such as dodecylbenzene or tridecylbenzene. In this manner a thin flowing film of the organic liquid reactant to be sulfonated is exposed to and reacted with $SO_3$ to form a sulfonic acid such as dodecylbenzene sulfonic acid. The sulfonic acid and used inert diluent gas containing small amounts of residual $SO_3$, sulfonic acid, sulfonic acid anhydride, and unreacted organic liquid reactant as contaminants are continuously separated from each other by a mechanical separator and withdrawn from the reaction zone during the process. As in batch sulfonation, the used inert diluent gas can either be recycled to pick up fresh $SO_3$ and reused, or expelled into the atmosphere, preferably recycled. Examples of such a process can be found in copending U.S. patent application No. 342,485 of John E. Vander Mey, filed Feb. 4, 1964, now Patent No. 3,328,460, for Process and Apparatus for Sulfonation of Organic Compounds.

It has been found to be preferable to recycle the used inert diluent gas in both of the above types of sulfonation processes, since processes using recycle require considerably less gas treating equipment for the incoming inert diluent gas. In sulfonation processes of the type described above, the incoming inert diluent gas to be fed to the reaction zone must first be dried to a dew point of less than about $-20°$ F., since if gas containing more moisture than this is used in the sulfonation process, a discolored and thus undesirable product results. The gas drying equipment needed to handle the volume flow required in the above-described sulfonation processes is both large and expensive if gas recycle is not used. This equipment can be largely eliminated by using a process which recycles the used inert diluent gas because processes using used diluent gas recycle require treatment of a much smaller volume of gas, since only enough gas need be dried to fill the gas recycle system once and the dried inert diluent gas is then used again and again. Other equipment which can be eliminated by the use of a process which recycles the used inert diluent gas is equipment, such as incinerators, which was previously necessary to purify the used diluent gas before returning it to the atmosphere, in order to avoid air pollution.

However, a problem has arisen in sulfonation processes using diluent gas recycle which has largely prevented the use of such processes. This problem is discolored product and it is caused by the fact that the used diluent gas passing from the reaction zone carries small amounts of residual $SO_3$, sulfonic acid, sulfonic acid anhydride and unreacted organic liquid reactant therein as contaminants which were picked up in the reaction zone. When used inert diluent gas containing these contaminants is recycled, discolored product results. The exact cause of this product discoloration is uncertain but it is believed to be caused by oversulfonation of the sulfonic acid remaining in the recycled used diluent gas by the fresh $SO_3$, or by sulfonic acid anhydrides present in the recycled used diluent gas. Whatever the cause, this discoloration impairs the salability of the product. Acceptable level of color in the product varies according to the particular product being manufactured. Examples of acceptable color levels are about 50–60 Klett for linear dodecylbenzene sulfonic acids, about 75 Klett for branched chain dodecylbenzene sulfonic acids, about 10 Klett for lauryl acid sulfates, and about 50 Klett for ethoxylated lauryl acid sulfates. Klett refers to the color as measured on a Klett-Summerson photoelectric colorimeter made by the Klett Manufacturing Co. of New York. The color measurement is conducted on a 5% active solution of the product using a 40 mm. cell.

Attempts have been made to correct this problem by the use of highly efficiently mechanical separators to separate all sulfonic acid, sulfonic acid anhydride, and unreacted organic liquid reactant from the used diluent gas before recycling it. These attempts have not been successful in avoiding discolored product.

Attempts have also been made to remove the sulfonic acid, sulfonic acid anhydride and unreacted organic liquid reactant contaminants from the used diluent gas by the use of filters before recycling the gas. These attempts have been somewhat successful in reducing discolored product but the use of filters for this purpose is cumbersome and reduces process yield. Use of filters is cumbersome because the contaminants deposit on the filters and form tar thereon, thus requiring frequent filter changes. Furthermore, the use of filters is disadvantageous in that the contaminants collected thereon are discarded as waste product rather than utilized in the process; process yield is thus reduced.

It is an object of this invention to achieve a process for removal of contaminants from the used diluent gas of sulfonation processes of the type mentioned above so as to permit recycle of used diluent gas without producing discolored product.

It is also an object of this invention to achieve the removal of contaminants without the use of cumbersome filters.

It is a further object of this invention to utilize the removed contaminants as reactant so as to improve the yield of the sulfonation processes.

We have now discovered process improvements whereby used diluent gas can be recycled without product discoloration and without the need for highly efficient mechanical separators or filters. Briefly, our process improvements comprise the steps of:

(a) Scrubbing contaminants comprising small amounts of residual $SO_3$, sulfonic acid, sulfonic acid anhydride, and unreacted organic liquid reactant from the used inert diluent gas by scrubbing the gas containing the contaminants with a scrubbing liquid consisting of organic liquid reactant of the same kind used in the reaction, said scrubbing liquid being present in a ratio of at least about 0.001 pound per s.c.f. of used inert diluent gas for batch operation and at least about 0.05 pound per hour per s.c.f.m. of used inert diluent gas for continuous operation.

(b) Introducing the fresh $SO_3$ into the scrubbed used inert diluent gas at or near the beginning of the reaction zone, (c) Recycling used scrubbing liquid to the reaction zone for use as at least part of the organic liquid reactant, the organic liquid reactant containing not more than about 95% sulfonic acid.

Our new process improvements have the advantage that they permit recycle of the used diluent gas without resulting in discolored product. Our new process improvements thus allow use of the previously mentioned smaller and less costly gas drying equipment which can be used with sulfonation processes using recycle gas systems. Another advantage of our new process improvements is they avoid the need for highly efficient mechanical separators for separating liquid from gas after the reaction zone. (It may still be desirable to use a separator, but the separator may be of a simpler, cheaper and less efficient type.) A further advantage of our new process improvements is that they avoid the need for filters to clean the contaminants from the used inert diluent gas and thus avoid the need for frequent changing of the filters. A still further advantage of our new process improvements is that the used scrubbing liquid can be recycled and used as at least part of the organic liquid reactant in the sulfonation reaction, thus utilizing the contaminants which have been scrubbed from the gas and increasing process yields. This latter advantage was particularly unexpected. Since the used scrubbing material is already partially sulfonated, it would normally be expected by those skilled in the art that recycling would result in an oversulfonated and thus discolored product. Such has not been found to be the case.

In carrying out the process of our invention a sulfonatable organic liquid reactant is reacted in a reaction zone with a mixture of about 1 part by volume of $SO_3$ in about 5 to about 50 parts by volume of an inert diluent gas, usually air, the product temperature being maintained at about 25° to about 65° C. The $SO_3$ supplied to the reaction zone is generally maintained slightly in excess of the stoichiometric quantity required by the reaction, but under certain circumstances such as sulfation it may be desirable to use slightly less than the stoichiometric amount. Used diluent gas is continuously removed from the reaction zone and fed to a scrubber containing a sulfonatable organic liquid of the same kind used as reactant in the reaction zone. In the scrubber contaminants comprising small amounts of residual $SO_3$, sulfonic acid, sulfonic acid anhydride and unreacted organic liquid reactant are removed from the used diluent gas. To achieve effective scrubbing of the used diluent gas, the ratio of scrubbing liquid to used diluent gas should be at least about 0.001 pound of liquid per s.c.f. of used inert diluent gas for batch operation and at least about 0.05 pound per hour per s.c.f.m. of used inert diluent gas for continuous operation. The preferred ratio of scrubbing liquid to used diluent gas is at least about 0.003 pound of liquid per s.c.f. of used diluent gas for batch operation and at least about 1–2 pounds per hour per s.c.f.m. of used diluent gas for continuous operation. It has been found that, if the line is long through which the used diluent gas is led to the scrubber, some tar may form in the line due to deposition of contaminants on the walls of the line and reaction of the contaminants with each other. This condition can be corrected by flushing the line with a small amount of scrubbing liquid to prevent deposition of contaminants on the walls of the line. We have called such a flushing arrangement a prescrubber. However, we have found that, if the line from the reaction zone to the prescrubber is kept quite short; deposition in the line is avoided and no prescrubber is needed.

After the used diluent gas has been scrubbed it is mixed with fresh $SO_3$ and recycled to the reaction zone. We have found that the color of the product from the sulfonation reaction can be substantially improved by introducing the fresh $SO_3$ into the scrubbed used diluent gas at a point near, i.e. as close as possible to, the beginning of the reaction zone, and preferably at the beginning of the reaction zone. Small particles of scrubbing liquid are believed to be carried from the scrubber by the scrubbed used diluent gas and these are believed to char when exposed to the highly reactive fresh $SO_3$ thus causing discolored product. This aspect of our invention has the advantage that it substantially reduces or eliminates such charring and discoloration by reducing the time during which these small particles are the only organic liquid reactant present to react with the $SO_3$. After fresh $SO_3$ is mixed with the scrubbed used diluent gas, the mixture is recycled to the reaction zone.

Another novel aspect of our invention is that we have found that the scrubbing liquid which has been used to remove the contaminants from the used diluent gas can be recycled and used as part or all of the organic liquid reactant used in the reaction zone. This was indeed surprising due to the fact that this used scrubbing liquid is already partially sulfonated due to reaction with residual $SO_3$ and also due to scrubbing sulfonic acid from the used diluent gas. One skilled in the art would expect that to run partially sulfonated feed through a sulfonation reaction zone would result in oversulfonation and resultant discolored product. However, we have found that as long as the organic liquid reactant fed to the reaction zone contains less than about 95% by weight sulfonic acid, preferably less than about 10%, discolored product does not result. This aspect of our invention has the advantage that it increases process yield by allowing utilization of the contaminants which have been removed by scrubbing.

The invention will be described more particularly with respect to the following drawings in which.

Figure 1:
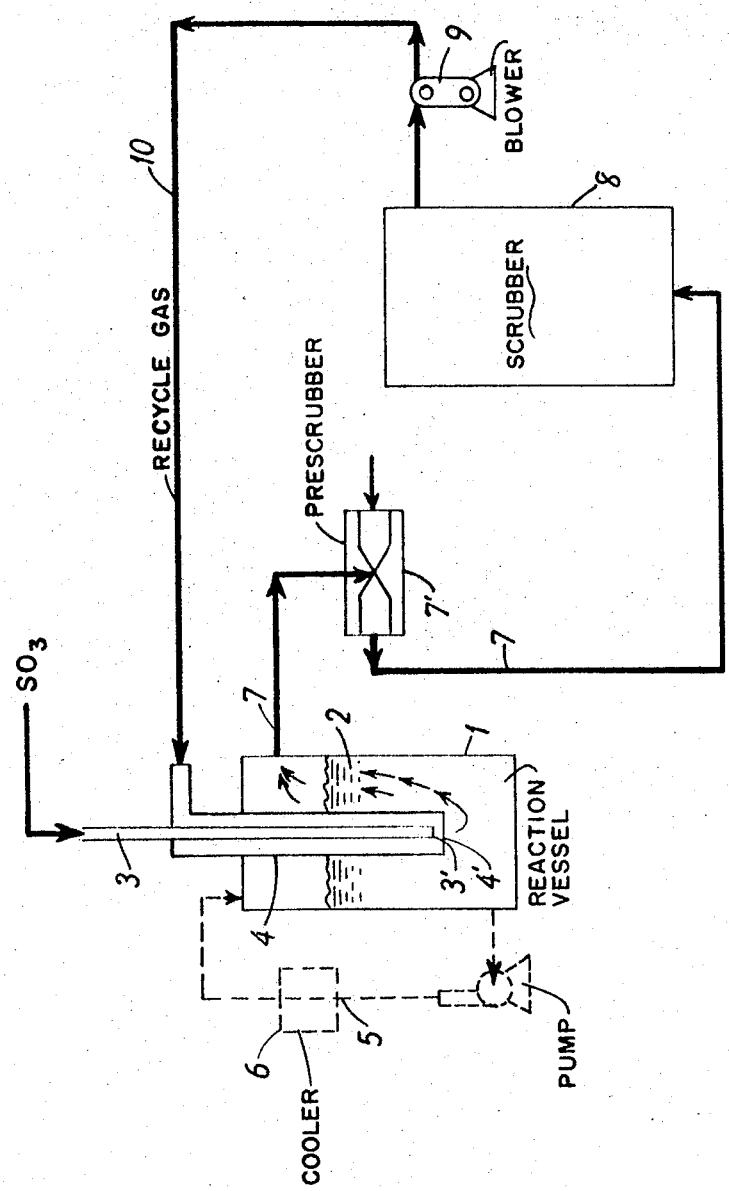
FIGURE 1 is a schematic view of the process of this invention using batch operation.

With reference to FIGURE 1, reference numeral 1 indicates a sulfonation reaction vessel for batch operation containing a quantity of organic liquid reactant 2, such as dodecylbenzene. $SO_3$ feed gas is introduced below the surface of the liquid reactant 2 through a line 3. Recycled diluent gas is also introduced below the surface of liquid reactant 2 through line 4 which concentrically surrounds line 3. The lower end 4' of line 4 extends slightly beyond the lower end 3' of line 3 so as to insure mixing of the two gases as they emerge below the surface of liquid reactant 2. That portion of the vessel which is filled by organic liquid reactant 2 comprises a reaction zone in which sulfonation occurs. Since the sulfonation reaction is exothermic, means for cooling are provided. The cooling means are conventional and can consist of either a cooling jacket around the reaction vessel or a recirculating line such as is shown in dashed lines at 5 having a cooler 6 therein. The used diluent gas, containing small amounts of residual $SO_3$, sulfonic acid, sulfonic acid anhydride, and unreacted organic liquid reactant as contaminants, passes out of reaction vessel 1 through line 7 leading to scrubber 8. Positioned in line 7 is a prescrubber 7' which introduces into line 7 an amount of organic reactant liquid sufficient to flush the line in order to prevent any contaminants from the used diluent gas from depositing on the walls of the line for a sufficient period to react with each other and form tar. The prescrubber can consist, for example, of a venturi such as that shown, or a simple nozzle feeding into the line; if line 7 is kept quite short, the prescrubber can even be omitted. Upon entering scrubber 8 the used diluent gas is intimately contacted with a scrubbing liquid consisting of organic liquid reactant of the same kind used in the sulfonation reaction. The amount of scrubbing liquid used should be at least about 0.001 pound of liquid per standard cubic foot of diluent gas, preferably at least about 0.003 pound per s.c.f. The scrubbing operation can be carried out in any efficient conventional type of gas-liquid contact apparatus, for example, a packed column containing Raschig rings or Berl saddles. After passing through scrubber 8, the scrubbed used diluent gas passes through blower 9 and line 10 to be mixed with fresh $SO_3$ and recycled.

We have found that the fresh $SO_3$ tends to char any organic material which is present in the scrubbed used diluent gas and that such charring can be substantially eliminated by mixing the fresh $SO_3$ and recycled diluent gas at or near, i.e. as close as possible to, the point at which they enter the reaction zone.

According to another aspect of our invention, after sulfonation of the batch in the reaction vessel has been effected and the product removed from the vessel, the used scrubbing liquid can be removed from scrubber 8 and transferred to reaction vessel 1 for use as part or all of the next batch of sulfonatable organic liquid reactant to be sulfonated; however, in order to avoid discolored product the new batch to be sulfonated should not contain more than about 95% by weight, preferably not more than about 10%, sulfonic acid.

Figure 2:
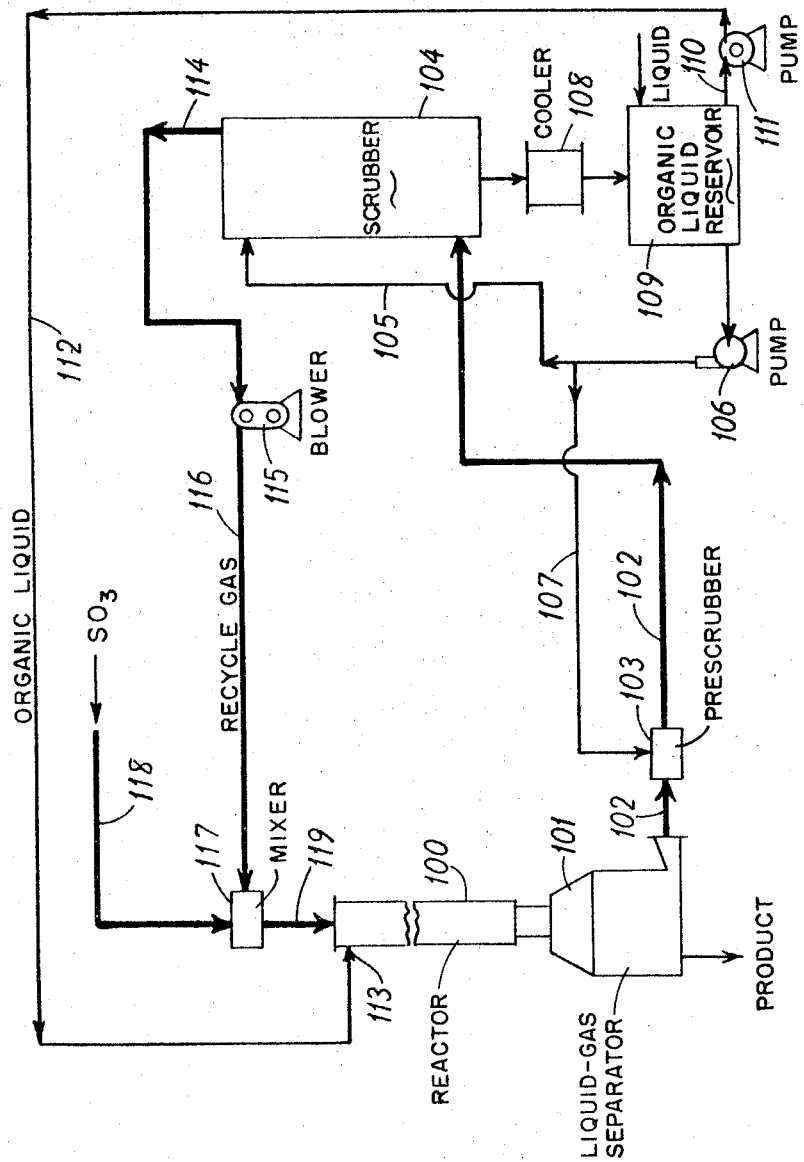
FIGURE 2 is a schematic view of the process of this invention using continuous operation.

With reference to FIGURE 2, reference numeral 100 indicates a continuous sulfonation reactor comprising a reaction zone consisting of a hollow tube down the inside wall of which is flowed a thin film of organic liquid reactant and through the center of which is flowed a gaseous stream of $SO_3$ mixed with an inert diluent gas such as air. The volume proportions of $SO_3$ to diluent gas can vary from about 1 to 5 to about 1 to 50. The $SO_3$ is substantially consumed in the reaction zone. The $SO_3$ supplied to the reaction zone is generally maintained slightly in excess of the stoichiometric quantity required by the reaction, but under certain circumstances such as sulfation it may be desirable to use slightly less than the stoichiometric amount. The temperature of the reaction product is maintained at from about 25° to 65° C. by a cooling jacket, not shown, around the reactor 100. Reference numeral 101 indicates a liquid-gas separator for separating the sulfonated liquid product from the used inert diluent gas. Reference numeral 102 indicates the gas line carrying the used diluent gas from separator 101 to scrubber 104. The used diluent gas contains contaminants comprising small amounts of residual $SO_3$, sulfonic acid, sulfonic acid anhydride, and unreacted organic liquid reactant. Reference numeral 103 indicates a prescrubber which flushes gas line 102 with a small amount of scrubbing liquid of the same kind used in scrubber 104 in order to prevent deposition and oversulfonation in the line of contaminants from the used diluent gas. If line 102 is kept quite short, no prescrubber need be used. Reference numeral 104 indicates the scrubber which removes the contaminants from the used diluent gas. Into the scrubber is fed, from a line 105 and circulating pump 106, scrubbing liquid of the same kind used as organic liquid reactant in reactor 100. Circulating pump 106 also feeds liquid from reservoir 109 through line 107. Used liquid scrubbing material emerges from scrubber 104 and passes through cooler 108, which cools it to about ambient temperature, and into reservoir 109 from where it is pumped through line 110 by pump 111 through line 112 to a point 113 at the beginning of the reaction zone of reactor 100. In order to insure proper scrubbing, the amount of liquid fed through scrubber 104 should be at least about 0.05 pound of liquid per hour per s.c.f.m. of diluent gas.

The scrubbed used diluent gas emerges from scrubber 104 and passes through line 114, blower 115, line 116, and mixer 117, where it picks up fresh $SO_3$ being fed through line 118. The $SO_3$ and scrubbed used diluent gas are mixed at 117 and then passed through line 119 into the reaction zone.

For purposes of clarity the drawing shows mixer 117 separated by line 119 from reactor 100. However, it is one novel aspect of our invention that the fresh $SO_3$ should be introduced into the scrubbed used diluent gas at or near, i.e. as close as possible to, the reaction zone; therefore, line 119 should be kept as short as posisble or even eliminated entirely.

Another novel and unobvious aspect of our invention is the use of used scrubbing liquid as at least part of the sulfonatable organic liquid reactant used in the reaction zone. In the continuous sulfonation process represented by FIGURE 2 of the drawing this aspect is carried out by recycling used scrubbing liquid from scrubber 104 to point 113 at the beginning of the reaction zone. In order to insure against discolored product, the organic liquid reactant material fed at point 113 to the reaction zone should not contain more than about 95% sulfonic acid, preferably not more than about 10%.

The following examples, in which parts are by weight, are illustrative of the processes of this invention.

EXAMPLE I 2683 parts of branched chain dodecylbenzene were sulfonated in a batch operation (see FIGURE 1). The dodecylbenzene was introduced into a sulfonation reaction vessel, and 12 parts/min. of vaporized $SO_3$, premixed with 72.9 parts/min. (2 s.c.f.m.) of air, were passed into the liquid dodecylbenzene at a uniform rate over a period of about 75 minutes. The reaction vessel was externally cooled to maintain its temperature between 50 and 60° C. The used diluent gas leaving the reaction vessel through line 7 comprised air, a small amount of unreacted $SO_3$ and traces of sulfonic acid mist and unreacted organic liquid reactant. The used diluent gas was passed continuously into a scrubber containing 177 parts of dodecylbenzene. Oversulfonation of the trace of sulfonic acid in the gas line leading to the scrubber was prevented by flushing the line with 2 parts/min. of dodecylbenzene through a prescrubber consisting of a small packed column located immediately following the reaction vessel. Complete reaction of the contaminants in the used diluent gas with the dodecylbenzene in the scrubber was effected, as evidenced by absence of heavy tars or sludges in the gas line leaving the scrubber.

EXAMPLE II

Linear dodecylbenzene was sulfonated in a continuous operation (see FIGURE 2) in a tubular externally cooled reactor. The dodecylbenzene was automatically admitted to organic reservoir 109 at the rate of 350 parts per hour. It was there blended with used scrubbing liquid from organic scrubber 104. As a result, the feed directed to reactor 100 by pump 111 contained a few percent (about 2.2%) sulfonic acid. This organic feed was sulfonated in reactor 100 by the use of 119 parts per hour of $SO_3$ vapor which was premixed with 1074 parts/hr. (234 s.c.f.m.) of air in mixer 117, the resultant gas mixture being circulated through the reactor by recycle blower 115. The amount of $SO_3$ mixed with diluent gas (4% by volume) was such that there was a slight excess of $SO_3$ leaving the reactor with the diluent gas and product sulfonic acid in order to assure that the concentration of unsulfonated organic compound in the product sulfonic acid would be kept at a very low level. The temperature of the product sulfonic acid was maintained at about 52° to 54° C. by controlling the flow of water through cooling jackets (not shown) on the reactor. The product sulfonic acid was removed from the gas stream in the gas-liquid separator 101 following the reactor. The separated used diluent gas consisted of air, and contaminants comprising a small amount of residual $SO_3$ and trace quantities of partially sulfonated organic liquid and was directed into organic scrubber 104. Oversulfonation of the contaminants of the diluent in line 102 was prevented by delivering 855 to 1290 parts per hour (2 to 3 gallons/minute) from the output of pump 106 into this line through a spray nozzle (not shown) so as to flush the line. The contaminants in the diluent gas were absorbed in scrubber 104, a packed column over which approximately 4278 parts per hour (10 gallons/minute) of scrubbing liquid was circulated from reservoir 109. The scrubbed used dilent gas leaving organic scrubber 104 contained no residual $SO_3$. Hence, no heavy tars or sludges were formed in the remainder of the gas system. Quality of the product sulfonic acid was excellent (48 Klett color, 0.96% unreacted organic feed and 1.65% $H_2SO_4$). Yields of both dodecylbenzene and $SO_3$ were 100%.

EXAMPLE III

Linear alkyl benzene (NAD Aclate LM made by National Aniline Division of Allied Chemical Corporation, New York, N.Y., molecular weight 238) was sulfonated in the same manner as in Example II. The alkylate feed rate was again 350 parts per hour while 118 parts per hour of $SO_3$ were mixed with 1066 parts/hr. (232 s.c.f.m.) of diluent gas (air) to give a 4% concentration by volume. The performance of the organic scrubber was equally as good as Example II as evidenced by the high quality of the product sulfonic acid. The product temperature was maintained at 61° C. The product analyzed 51 Klett color, 1.06% unreacted organic feed and 1.40% $H_2SO_4$.

EXAMPLE IV

Ethoxylated lauryl alcohol (Conoco Alfonic 1014-4 made by Continental Oil Co.) was sulfated in continuous operation (see FIGURE 2) in a tubular, externally cooled reactor using a recycled diluent gas system. Rate of alcohol feed automatically admitted to organic reservoir 109 was 300 parts per hour. The alcohol was blended in the reservoir with used scrubbing liquid from organic scrubber 104 so that the feed directed to the reactor 100 by pump 111 contained a few percent (about 3.8%) ethoxylated lauryl sulfate. This organic feed was sulfated in reactor 100 by 87.5 parts per hour of $SO_3$ vapor which was premixed with 1057 parts/hr. (230 s.c.f.m.) of diluent gas (air) so as to achieve a 3% by volume mixture. The $SO_3$ and air were mixed in mixer 117 before being introduced into reactor 100. The gas mixture was circulated through the system by recycle blower 115. Although there was an overall deficiency of $SO_3$ injected into the diluent gas, (molar ratio of $SO_3$ to alcohol=0.97) there was still a trace of $SO_3$ leaving the reactor with the diluent gas. The temperature of the sulfated product was maintained at 39° to 40° C. by controlling the flow of water through the reactor cooling jacket (not shown). The product ethoxylated lauryl sulfate was removed from the diluent gas stream in separator 101 following the reactor.

The used diluent gas carrying contaminants comprising trace quantities of $SO_3$ and partially sulfated organic material was directed into the line 102 where oversulfation of the organic constituent was prevented by delivering 2 to 3 gallons per minute from the output of the organic circulating pump 106 into the line through a spray nozzle located at 103. The contaminants in the diluent gas were absorbed by the scrubbing liquid in the organic scrubber, which in this case was a packed column in which approximately 10 gallons per minute of the organic scrubbing compound was circulated from reservoir 109. The diluent gas leaving the organic scrubber contained no residual $SO_3$. The quality of the product was excellent (about 50 Klett color, 3% unreacted organic feed and 0.8% $H_2SO_4$) and yields on both ethoxylated lauryl alcohol and $SO_3$ were 100%.

While the invention has been described with particular reference to specific embodiments, it is to be understood that it is not to be limited thereto but is to be construed broadly and restricted solely by the scope of the appended claims.

We claim:

1. In a sulfonation process which comprises sulfonating a sulfonatable organic liquid reactant by reacting it in a reaction zone with a mixture of $SO_3$ in an inert diluent gas, removing used inert diluent gas from the reaction and mixing it with fresh $SO_3$, and recycling the latter mixture into the reaction zone, the improvement comprising the steps of:
   (a) scrubbing contaminants comprising small amounts of residual $SO_3$, sulfonic acid, sulfonic acid anhydride, and unreacted organic liquid reactant from the used inert diluent gas by scrubbing the gas containing the contaminants with a scrubbing liquid consisting of organic liquid reactant of the same kind used in the reaction, said scrubbing liquid being present in a ratio of at least about 0.001 pound per s.c.f. of used inert diluent gas for batch operation and at least about 0.05 pound per hour per s.c.f.m. of used inert diluent gas for continuous operation,
   (b) introducing the fresh $SO_3$ into the scrubbed used inert diluent gas at or near the beginning of the reaction zone,
   (c) recycling used scrubbing liquid to the reaction zone for use as at least part of the organic liquid reactant, the organic liquid reactant containing not more than about 95% by weight sulfonic acid.

2. The process of claim 1 wherein the scrubbing liquid is present in a ratio of at least about 0.003 pound per s.c.f. of used diluent gas for batch operation and at least about 1-2 pounds per hour per s.c.f.m. of used diluent gas for continuous operation and the organic liquid reactant contains not more than about 10% by weight sulfonic acid.

3. In a sulfonation process which comprises sulfonating a sulfonatable organic liquid reactant by reacting it in a reaction zone with a mixture of $SO_3$ in an inert diluent gas, removing used inert diluent gas from the reaction and mixing it with fresh $SO_3$, and recycling the latter mixture into the reaction zone, the improvement comprising the steps of:
   (a) scrubbing contaminants comprising small amounts of residual $SO_3$, sulfonic acid, sulfonic acid anhydride, and unreacted organic liquid reactant from the used inert diluent gas by scrubbing the gas containing the contaminants with a scrubbing liquid consisting of organic liquid reactant of the same kind used in the reaction, said scrubbing liquid being present in a ratio of at least about 0.001 pound per s.c.f. of used inert diluent gas for batch operation and at least about 0.05 pound per hour per s.c.f.m. of used inert diluent gas for continuous operation, (b) introducing the fresh $SO_3$ into the scrubbed used inert diluent gas at or near the beginning of the reaction zone.

4. The process of claim 3 wherein the scrubbing liquid is present in a ratio of at least about 0.003 pound per s.c.f. of used diluent gas for batch operation and at least about 1-2 pounds per hour per s.c.f.m. of used diluent gas for continuous operation.

5. In a sulfonation process which comprises sulfonating a sulfonatable organic liquid reactant by reacting it in a reaction zone with a mixture of $SO_3$ in an inert diluent gas, removing used inert diluent gas from the reaction and mixing it with fresh $SO_3$ and recycling the latter mixture into the reaction zone, the improvement comprising the steps of:

(a) scrubbing contaminants comprising small amounts of residual $SO_3$, sulfonic acid, sulfonic acid anhydride, and unreacted organic liquid reactant from the used inert diluent gas by scrubbing the gas containing the contaminants with a scrubbing liquid consisting of organic liquid reactant of the same kind used in the reaction, said scrubbing liquid being present in a ratio of at least about 0.001 pound per s.c.f. of used inert diluent gas for batch opeartion and at least about 0.05 pound per hour per s.c.f.m. of used inert diluent gas for continuous operation, (b) recycling used scrubbing liquid to the reaction zone for use as at least part of the organic liquid reactant, the organic liquid reactant containing not more than about 95% by weight sulfonic acid.

6. The process of claim 5 wherein the scrubbing liquid is present in a ratio of at least about 0.003 pound per s.c.f. of diluent gas for batch operation and at least about 1-2 pounds per hour per s.c.f.m. of used diluent gas for continuous operation and the organic liquid reactant contains not more than about 10% by weight sulfonic acid.

No references cited.

LEON ZITVER, Primary Examiner

L. DE CRESCENTE, Assistant Examiner

U.S. Cl. X.R.

260—505, 513